(12) United States Patent
Nishio (10) Patent No.: US 8,626,077 B2
(45) Date of Patent: *Jan. 7, 2014

(54) RECEIVING APPARATUS AND RADIO COMMUNICATION METHOD

(71) Applicant: Panasonic Corporation, Osaka (JP)

(72) Inventor: Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/678,309

(22) Filed: Nov. 15, 2012

(65) Prior Publication Data

US 2013/0090069 A1  Apr. 11, 2013

Related U.S. Application Data

(63) Continuation of application No. 13/372,219, filed on Feb. 13, 2012, now Pat. No. 8,340,589, and a continuation of application No. 12/958,066, filed on Dec. 1, 2010, now Pat. No. 8,140,022, and a continuation of application No. 11/658,572, filed as application No. PCT/JP2005/012843 on Jul. 12, 2005, now Pat. No. 7,869,760.

(30) Foreign Application Priority Data

Jul. 30, 2004  (JP) ................................ 2004-224657

(51) Int. Cl.
*H04B 17/00*  (2006.01)

(52) U.S. Cl.
USPC ....... 455/67.11; 455/63.1; 455/65; 455/67.16

(58) Field of Classification Search
USPC ............................ 455/63.1, 65, 67.11, 67.16
See application file for complete search history.

(56) References Cited

U.S. PATENT DOCUMENTS

| | | | |
|---|---|---|---|
| 6,337,985 B1 | 1/2002 | Roux |
| 6,345,036 B1 | 2/2002 | Sudo |
| 6,512,738 B1 | 1/2003 | Namekata |
| 6,745,009 B2 | 6/2004 | Raghothaman |
| 6,842,632 B2 | 1/2005 | Raghothaman |

(Continued)

FOREIGN PATENT DOCUMENTS

| | | |
|---|---|---|
| EP | 0 966 125 | 12/1999 |
| JP | 2000-332723 | 11/2000 |

OTHER PUBLICATIONS

Office Action dated Sep. 15, 2012 in the corresponding Indian Patent Application.
PCT International Search Report dated Sep. 20, 2005.

(Continued)

*Primary Examiner* — Fayyaz Alam
(74) *Attorney, Agent, or Firm* — Dickinson Wright PLLC (57) ABSTRACT

A radio communication device capable of lightening the influence of a frequency selective fading in the wide-band transmission of a single carrier thereby to prevent deterioration of error rate characteristics. In this device, an FFT unit subjects a modulated signal inputted from a modulation unit to a Fourier transformation. A pilot insertion unit inserts a pilot symbol into a plurality of individual frequency components of the modulated signal. Weight multiplication units multiply the individual frequency components and the pilot symbols inserted into the individual frequency components, by weight coefficients set at a weight coefficient setting unit. IFFT units subject the frequency components to an inverse Fourier transformation, thereby to convert the frequency components into time domains.

5 Claims, 10 Drawing Sheets

(56) References Cited

U.S. PATENT DOCUMENTS

| | | | |
|---|---|---|---|
| 7,392,015 B1 * | 6/2008 | Farlow et al. | 455/67.11 |
| 7,535,969 B2 * | 5/2009 | Catreux et al. | 375/267 |
| 7,606,137 B2 * | 10/2009 | Shattil | 370/208 |
| 7,869,537 B2 * | 1/2011 | Catreux et al. | 375/267 |
| 2003/0161282 A1 | 8/2003 | Medvedev | |
| 2004/0082299 A1 | 4/2004 | Brunner | |

OTHER PUBLICATIONS

H. Kobayashi, et al., "Tekio Hencho O Mochilta Single Carrier OFDM Tsushin Hoshiki—Single Carrier OFDM Technique with Adaptive Modulation Method," Transactions of IEICE vol. J86-A, No. 12, Dec. 2003, pp. 1329-1339.

D. Falconer, et al., "Frequency Domain Equalization for Single-Carrier Broadband Wireless Systems," IEEE Communications Magazine, Apr. 2002, pp. 58-66.

H. Gacanin, et al., "Shuhasu Ryoiki Toka O Mochiiru ippanka OFDM—Generalized OFDM with Frequency-domain Equalization," Technical Report of IEICE, MW2003-252, vol. 103, No. 686, Mar. 2004, pp. 19-24.

H. Tomeba, et al., "Shuhasu Ryoiki Toka Soshin Diversity O Mochlita MC-CDMA Nobori Link no Ayamariritsu Tokusei—The Uplink BER Performance of MC-CDMA with Frequency-domain Pre-equalization Transmit Diversity," Technical Report of IEICE, RCS2004-67, vol. 104, No. 63, May 2004, pp. 68-72, with English abstract.

H. Tomeba, et al., "DS-CDMA Ido Musen ni Okeru Shubasu Ryoiki Toka Soshin Diversity—Frequency-domain Pre-equalization Transmit Diversity for DS-CDMA Mobile Radio," Technical Report of IEICE, RCS2004-123, vol. 104, No. 257, Aug. 2004, pp. 19-24, with English abstract.

Supplementary European Search Report dated Dec. 2, 2011.

* cited by examiner

RECEIVING APPARATUS AND RADIO COMMUNICATION METHOD

This is a continuation application of application Ser. No. 13/372,219 filed Feb. 13, 2012, which is a continuation application of application Ser. No. 12/958,066 filed Dec. 1, 2010, which is a continuation application of application Ser. No. 11/658,572 filed Jan. 26, 2007, which is a national stage of PCT/JP2005/012843 filed Jul. 12, 2005, which is based on Japanese Application No. 2004-224657 filed Jul. 30, 2004, the entire contents of each of which are incorporated by reference herein.

TECHNICAL FIELD

The present invention relates to a radio communication apparatus and radio communication method.

BACKGROUND ART

Looking toward next-generation mobile communication systems, various studies have been conducted on radio transmission systems suitable for high-speed packet transmission capable of achieving data rates in excess of 100 Mbps. Broadband is necessary for the frequency band used for such high-speed transmission, and the use of a bandwidth on the order of 100 MHz has been studied. However, when this kind of broadband transmission is performed using a single carrier in mobile communications, error rate characteristics deteriorate significantly due to multipath interference. Thus, frequency domain equalization has been studied as a technology for eliminating the effects of multipath interference in reproducing a waveform (see Non-patent Document 1, for example). Frequency domain equalization is an equalization technology that can be implemented with a simple configuration, in which equalization processing is performed for a signal transmitted by means of a single carrier by multiplying each frequency component of a received signal received by the inverse characteristic of a estimation value of propagation path frequency characteristic on the receiving side.

Non-patent Document 1: "Frequency domain equalization for single-carrier broadband wireless systems", Falconer, D.; Ariyavisitakul, S. L.; Benyamin-Seeyar, A.; Eidson, B.; Communications Magazine, IEEE, Volume: 40, Issue: 4, April 2002 Pages: 58-66

DISCLOSURE OF INVENTION

Problems to be Solved by the Invention

In single-carrier broadband transmission, if there is a frequency component whose reception level falls significantly due to the effects of frequency selective fading, equalization is not fully performed and a multipath interference component remains even if the above-described kind of frequency domain equalization is carried out, with the result that error rate characteristics deteriorate.

It is an object of the present invention to provide a radio communication apparatus and radio communication method that enable the effects of frequency selective fading to be reduced and deterioration of error rate characteristics to be prevented in single-carrier broadband transmission.

Means for Solving the Problems

A radio communication apparatus of the present invention employs a configuration that includes: a first antenna and a second antenna; a first conversion section that converts an input signal to the frequency domain to obtain a plurality of frequency components of the input signal; a weighting section that weights the plurality of frequency components using a first weighting factor and weights the plurality of frequency components using a second weighting factor; a second conversion section that converts the plurality of frequency components weighted using the first weighting factor to the time domain to obtain a first transmit signal and converts the plurality of frequency components weighted using the second weighting factor to the time domain to obtain a second transmit signal; and a transmitting section that transmits the first transmit signal and the second transmit signal from one or both of the first antenna and the second antenna.

Advantageous Effect of the Invention

The present invention enables the effects of frequency selective fading to be reduced and deterioration of error rate characteristics to be prevented in single-carrier broadband transmission.

BEST MODE FOR CARRYING OUT THE INVENTION

Embodiments of the present invention will now be described in detail with reference to the accompanying drawings. A radio communication apparatus described below is installed, for example, in a radio communication terminal apparatus or radio communication base station apparatus used in a mobile communication system.

Embodiment 1

Figure 1:
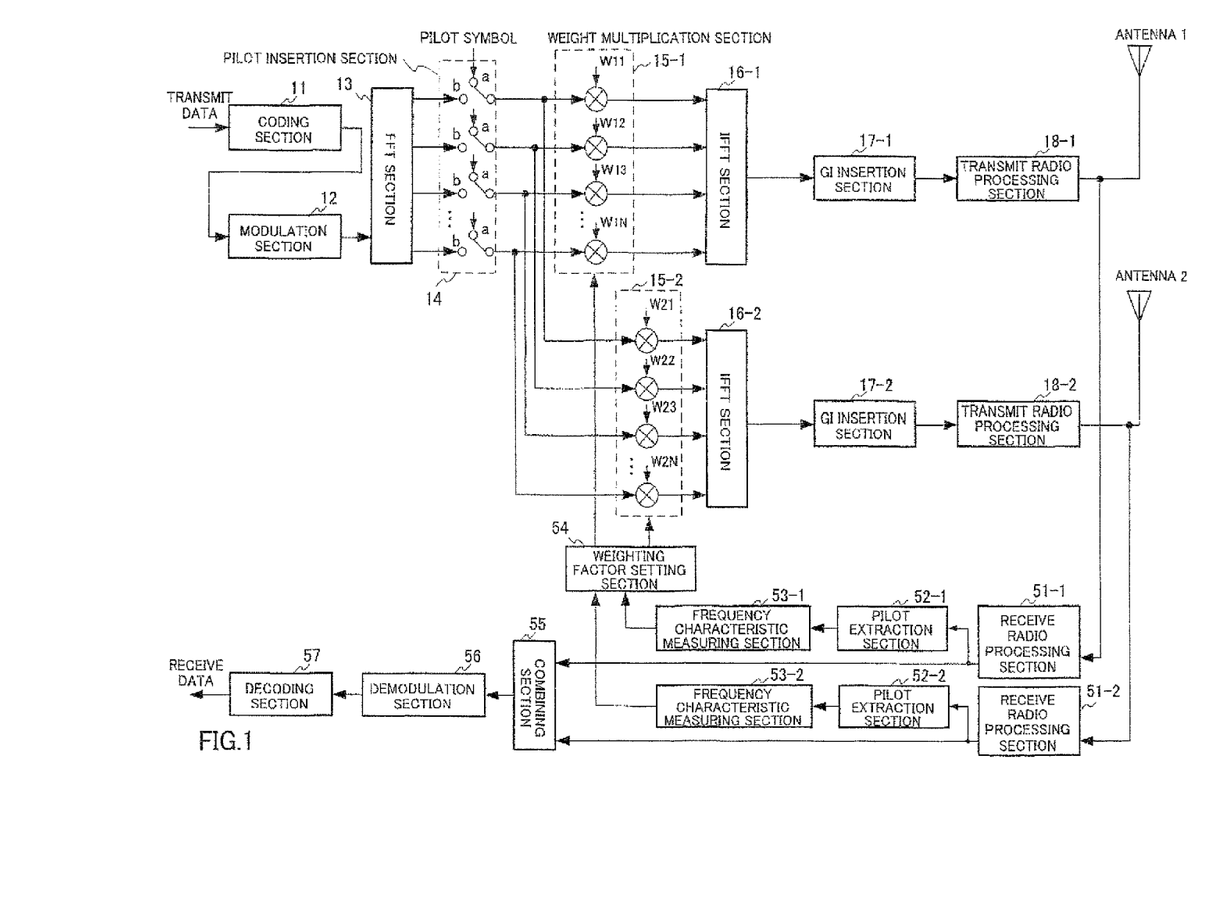
FIG. 1 is a block diagram showing the configuration of a radio communication apparatus according to Embodiment 1 of the present invention.

In the radio communication apparatus shown in FIG. 1, a coding section 11 codes input time-series transmit data.

A modulation section 12 modulates output from coding section 11 using a modulation method such as QPSK or 16 QAM to generate a modulated signal.

An FFT section 13 executes FFT (Fourier transform) processing on a modulated signal input from modulation section 12 to convert the modulated signal to the frequency domain. By means of this FFT processing, a plurality of frequency components 1 through N of the modulated signal are obtained. These frequency components 1 through N are input to a pilot insertion section 14.

Pilot insertion section 14 inserts a frequency-domain pilot symbol in each of input frequency components 1 through N, and inputs the frequency components to weight multiplication sections 15-1 and 15-2. Details of the processing performed by pilot insertion section 14 will be given later herein.

Weight multiplication sections 15-1 and 15-2 multiply weighting factors W11 through W1N and W21 through W2N set by a weighting factor setting section 54 by frequency components 1 through N and the pilot symbols inserted in frequency components 1 through N, thereby weighting frequency components 1 through N and pilot symbols with the same weighting factor. Weighting factors W11 through W1N multiplied in weight multiplication section 15-1 and weighting factors W21 through W2N multiplied in weight multiplication section 15-2 differ from each other. Frequency components 1 through N weighted by weight multiplication section 15-1 are input to an IFFT section 16-1, and frequency components 1 through N weighted by weight multiplication section 15-2 are input to an IFFT section 16-2.

IFFT section 16-1 executes IFFT (inverse Fourier transform) processing on input frequency components 1 through N to convert frequency components 1 through N to the time domain. By means of this processing, a transmit signal 1 containing frequency components 1 through N weighted by weights W11 through W1N is obtained. This transmit signal 1 has a guard interval inserted by a GI insertion section 17-1, undergoes radio processing such as up-conversion and amplification by a transmit radio processing section 18-1, and is then transmitted to a communicating party via an antenna 1.

IFFT section 16-2 executes IFFT processing on input frequency components 1 through N to convert frequency components 1 through N to the time domain. By means of this processing, a transmit signal 2 containing frequency components 1 through N weighted by weights W21 through W2N is obtained. This transmit signal 2 has a guard interval inserted by a GI insertion section 17-2, undergoes radio processing such as up-conversion and amplification by a transmit radio processing section 18-2, and is then transmitted to the communicating party via an antenna 2.

On the other hand, a receive radio processing section 51-1 executes radio processing such as down-conversion on a signal received via antenna 1, and inputs the signal to a pilot extraction section 52-1 and a combining section 55. A receive radio processing section 51-2 executes radio processing such as down-conversion on a signal received via antenna 2, and inputs the signal to a pilot extraction section 52-2 and combining section 55.

Pilot extraction section 52-1 extracts a pilot symbol contained in the signal received by antenna 1 and inputs the pilot symbol to a frequency characteristic measuring section 53-1. Frequency characteristic measuring section 53-1 measures a frequency characteristic of a propagation path between antenna 1 and the communicating party using this pilot symbol. Also, pilot extraction section 52-2 extracts a pilot symbol contained in the signal received by antenna 2 and inputs the pilot symbol to a frequency characteristic measuring section 53-2. Frequency characteristic measuring section 53-2 measures a frequency characteristic of a propagation path between antenna 2 and the communicating party using this pilot symbol. The frequency characteristic measurement method will be described later herein. The frequency characteristics measured by frequency characteristic measuring sections 53-1 and 53-2 are input to weighting factor setting section 54. Weighting factor setting section 54 sets weights W11 through W1N and weights W21 through W2N in accordance with the respective frequency characteristics. The setting method will be described later herein.

Combining section 55 combines the signal received by antenna 1 and the signal received by antenna 2, a demodulation section 56 demodulates the combined signal, and a decoding section 57 decodes the demodulated signal. By this means, receive data is obtained.

Figure 2:
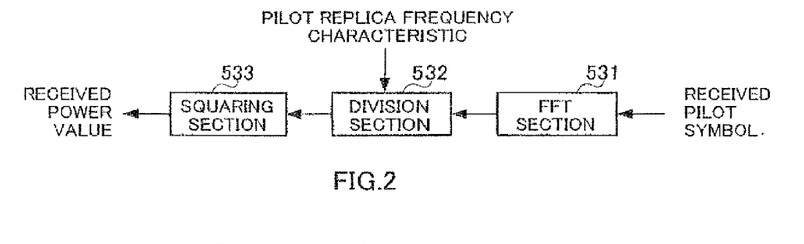
FIG. 2 is a block diagram showing the configuration of a frequency characteristic measuring section according to Embodiment 1 of the present invention.

Next, the processing performed by frequency characteristic measuring sections 53-1 and 53-2 will be described. Frequency characteristic measuring sections 53-1 and 53-2 are composed of an FFT section 531, a division section 532, and a squaring section 533, as shown in FIG. 2. By means of this configuration, frequency characteristic measuring sections 53-1 and 53-2 measure the frequency characteristics of the respective propagation paths—that is to say, the propagation path quality of each frequency component of the propagation path between antenna 1 and the communicating party and the propagation path between antenna 2 and the communicating party. Here, the received power value per frequency component of a pilot symbol is measured as the propagation path quality per frequency component as described below.

FFT section 531 executes FFT processing on an input received pilot symbol to convert the pilot symbol to the frequency domain. By means of this FFT processing, a plurality of frequency components 1 through N of the pilot symbol are obtained. These frequency components 1 through N are input to division section 532. Frequency components 1 through N obtained here correspond to frequency components 1 through N obtained by FFT section 13. Division section 532 divides each of frequency components 1 through N by frequency characteristic of a pilot replica. A pilot replica is a pilot waveform known to both the pilot symbol transmitting side (that is, the communicating party) and the pilot symbol receiving side (that is, the radio communication apparatus of this embodiment). By means of this division processing, channel estimation values are obtained for each of frequency components 1 through N. In squaring section 533, these channel estimation values are squared to give power values. By having this series of processes performed by frequency characteristic measuring sections 53-1 and 53-2, received power values are measured for each of frequency components 1 through N of the antenna 1 propagation path and the antenna 2 propagation path. The measured received power values are input to weighting factor setting section 54.

Next, the processing performed by weighting factor setting section 54 will be described. Weighting factor setting section 54 sets weighting factors W11 through W1N used by weight multiplication section 15-1 and weighting factors W21 through W2N used by weight multiplication section 15-2, in accordance with received power values input from frequency characteristic measuring section 53-1 (that is, the propagation path quality of each frequency component of the antenna 1 propagation path) and received power values input from frequency characteristic measuring section 53-2 (that is, the propagation path quality of each frequency component of the antenna 2 propagation path). As the setting method, a received power value input from frequency characteristic measuring section 53-1 and a received power value input from frequency characteristic measuring section 53-2 are compared for each of frequency components 1 through N, a weighting factor corresponding to the antenna where the received power value is larger is set to 1, and a weighting factor corresponding to the antenna where the received power value is smaller is set to 0. More specifically, for example, among frequency components 1 through N, received power values in frequency component 1 transmitted from antenna 1 (that is, the frequency component multiplied by weighting factor W11) and frequency component 1 transmitted from antenna 2 (that is, the frequency component multiplied by weighting factor W21) are compared, and if the received power value of frequency component 1 transmitted from antenna 1 is larger than the received power value of frequency component 1 transmitted from antenna 2, weighting factor W11 is set to 1, and weighting factor W21 is set to 0. Conversely, if the received power value of frequency component 1 transmitted from antenna 2 is larger than the received power value of frequency component 1 transmitted from antenna 1, weighting factor W21 is set to 1, and weighting factor W11 is set to 0. This processing is performed for all frequency components. By this means, each of frequency components 1 through N is transmitted from one of antenna 1 and antenna 2, which has larger received power. That is to say, transmitting antenna selection is performed for each frequency component. By selecting the antenna with the better propagation path quality as the transmitting antenna for each frequency component in this way, a greater transmission diversity effect can be achieved.

Figure 3:
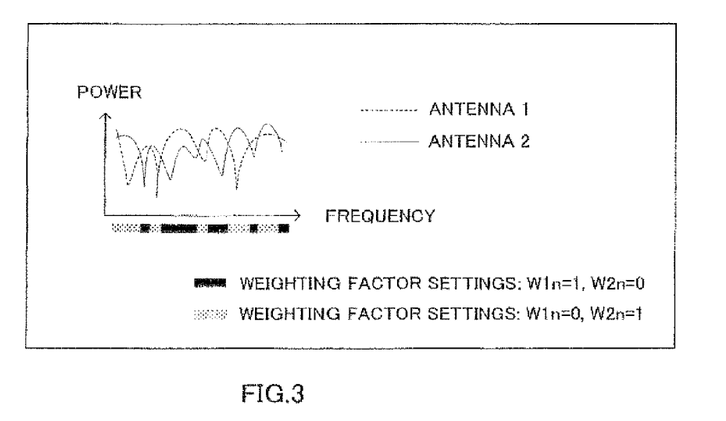
FIG. 3 is a frequency characteristic graph according to Embodiment 1 of the present invention.
Figure 4:
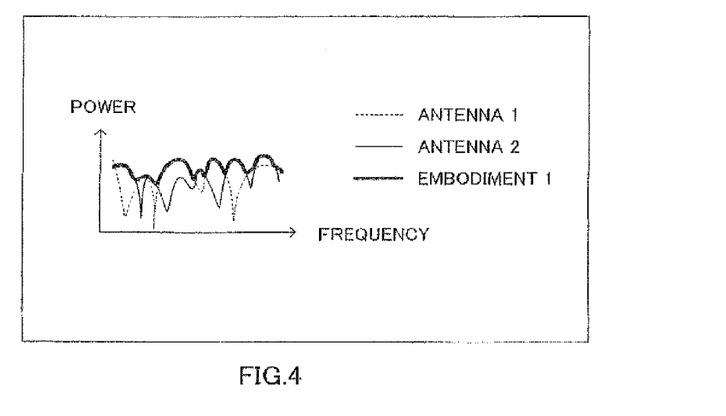
FIG. 4 is a frequency characteristic graph according to Embodiment 1 of the present invention.

The above-described comparison/selection processing is illustrated graphically in FIG. 3. The two curves shown in FIG. 3 represent the frequency characteristics of each antenna input to weighting factor setting section 54. As shown in FIG. 3, for each frequency component, the weighting factor corresponding to the antenna with the larger received power is set to 1, and the weighting factor corresponding to the antenna with the smaller received power is set to 0. As a result, the frequency characteristics in signal reception by the communicating party are as shown in FIG. 4. That is to say, since one of antenna 1 and antenna 2 which has a better propagation path quality is selected as the transmitting antenna for each frequency component, there are no longer any frequency components where the communicating party's received power falls significantly. AS a result, error rate characteristics can be improved compared with a case in which all frequency components are transmitted only from either antenna 1 or antenna 2.

Figure 5:
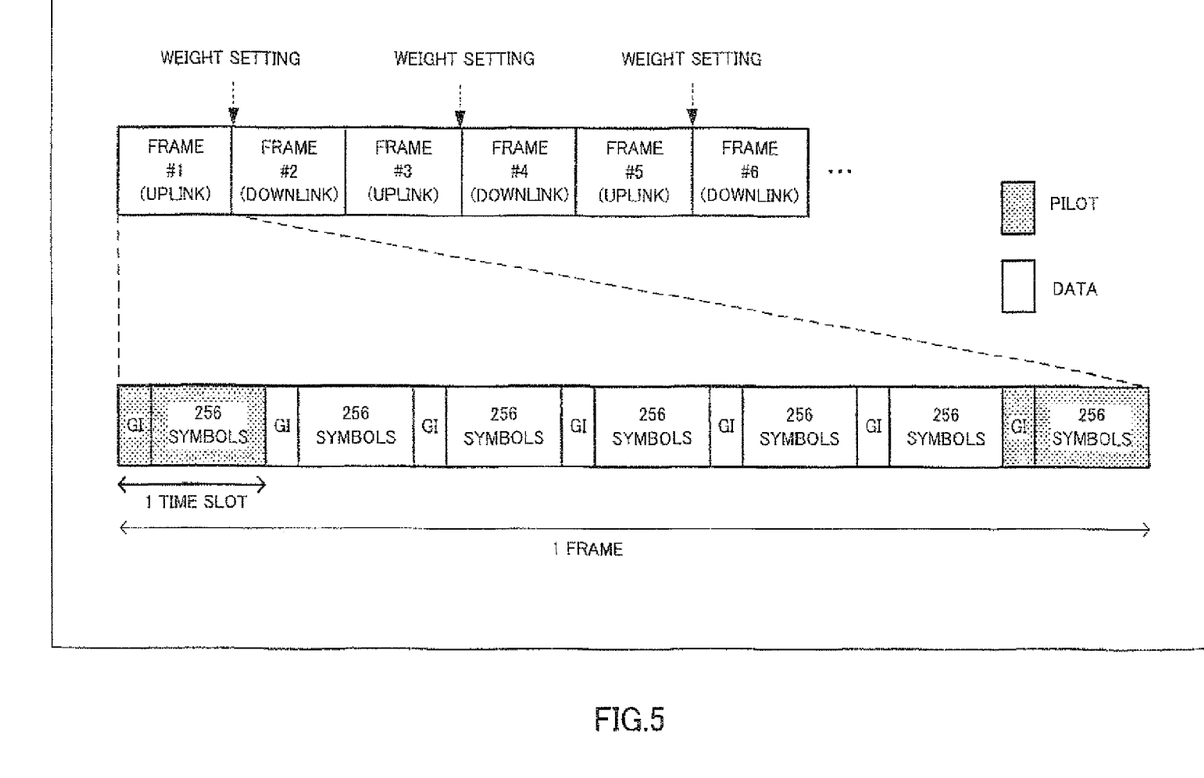
FIG. 5 is a frame configuration diagram (TDD system) according to Embodiment 1 of the present invention.

Next, the processing performed by pilot insertion section 14 will be described. FIG. 5 applies to a TDD system, and FIG. 6 to an FDD system.

Figure 6:
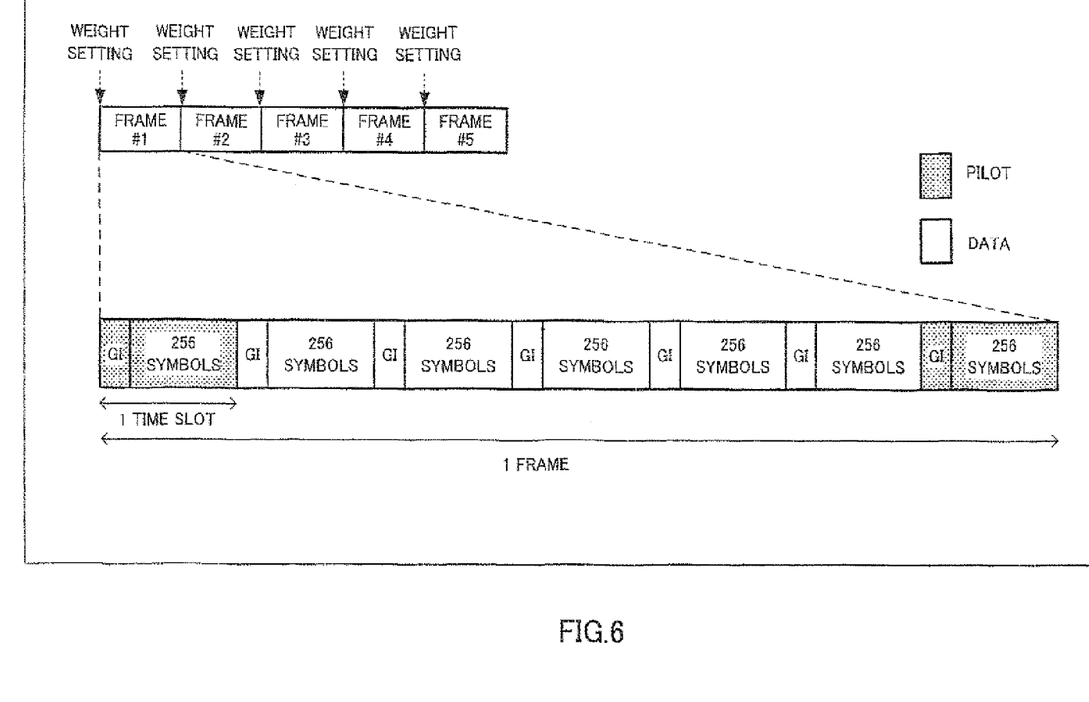
FIG. 6 is a frame configuration diagram (FDD system) according to Embodiment 1 of the present invention.

As shown in FIG. 5 and FIG. 6, in this embodiment each frame is divided into a plurality of time slots, and pilot symbols are transmitted in the start time slot and end time slot of each frame. Thus, in pilot insertion section 14, pilot symbols are inserted in each frequency component by having a switch corresponding to each frequency component connected to an "a" side at transmission timings of start time slot and end time slot, and to a "b" side at other timings. Also, in a TDD system, weighting factor updating in weighting factor setting section 54 is performed at the boundary between an uplink frame and downlink frame, as shown in FIG. 5, and the same weighting factor is used in all slots in one downlink frame. In an FDD system, on the other hand, weighting factor updating in weighting factor setting section 54 is performed at the boundary between each frame, as shown in FIG. 6, and the same weighting factor is used in all slots in one frame. By using such weighting factor update timing, a pilot part and data part are multiplied by the same weighting factor, so that in signal reception by a communicating party, the communicating party can receive a signal by means of the same kind of reception processing as when all frequency components are transmitted from only one antenna, as in the prior art.

Thus, according to this embodiment, a transmission diversity effect can be obtained for each frequency component, enabling a fall in power of frequency component due to the effects of frequency selective fading to be reduced, and as a result, enabling error rate characteristics to be improved. Also, since a weighting factor is set for each frequency component in accordance with propagation path frequency characteristics, transmission diversity effects can be further increased.

It is also possible for the communicating party to measure the propagation path quality of frequency components of each antenna and report the results to the radio communication apparatus of this embodiment, and for the radio communication apparatus to set a weighting factor in accordance with a reported propagation path quality. And it is also possible for the communicating party additionally to perform weighting factor setting in accordance with propagation path quality and report the results to the radio communication apparatus of this embodiment, and for the radio communication apparatus to multiply each frequency component by a reported weighting factor. In this way, the radio communication apparatus of this embodiment can be given an optimal configuration for an FDD system that uses propagation path of different frequencies for transmission and reception.

Embodiment 2

A radio communication apparatus according to this embodiment sets a weighting factor combination as a weighting factor multiplied by each frequency component, among a plurality of combinations of weighting factors W11 through W1N and W21 through W2N, where received power is largest at the communicating party that is the signal receiving side, in accordance with the propagation path quality of each frequency component.

A radio communication apparatus according to this embodiment differs from Embodiment 1 only in the operation of weighting factor setting section 54. When signals are transmitted from a plurality of antennas, a weighting factor whereby signals transmitted from each antenna are reinforced at the reception point is a weighting factor having an amplitude and phase such that $P_n$ expressed by Equation (1) is a maximum. Thus, weighting factor setting section 54 sets a weighting factor combination $w_n$ where $P_n$ of Equation (1) is a maximum as the weighting factors of the frequency components of each antenna. A plurality of weighting factor combination $w_n$ candidates are stored beforehand in weighting factor setting section 54, and weighting factor setting section 54 calculates $P_n$ for these combination candidates, selects the combination $w_n$ where $P_n$ is a maximum, and outputs this selected combination $w_n$ to weight multiplication sections 15-1 and 15-2.

$$P_n = w_n^H H_n^H H_n w_n \quad (1)$$

$$w_n = [w_{1n}, w_{2n}]^T, H_a = [h_{1n}, h_{2n}]$$

Here, $h_{1n}$ represents the propagation path quality of frequency component n of antenna 1, and $h_{2n}$ represents the propagation path quality of frequency component n of antenna 2. $^H$ represents a complex conjugate transposition, and $^T$ a transposition. $P_n$ is a value proportional to the received power when a signal transmitted after multiplication by weighting factor $w_n$ is received by the communicating party via a propagation path of propagation path quality $H_n$. Examples of $w_n$ candidates are those with either of $\{0.2, 0.8\}$ as the amplitude and any of $\{0, \pi/4, 2\pi/4, 3\pi/4, 4\pi/4, 5\pi/4, 6\pi/4, 7\pi/4\}$ as the phase.

Figure 7:
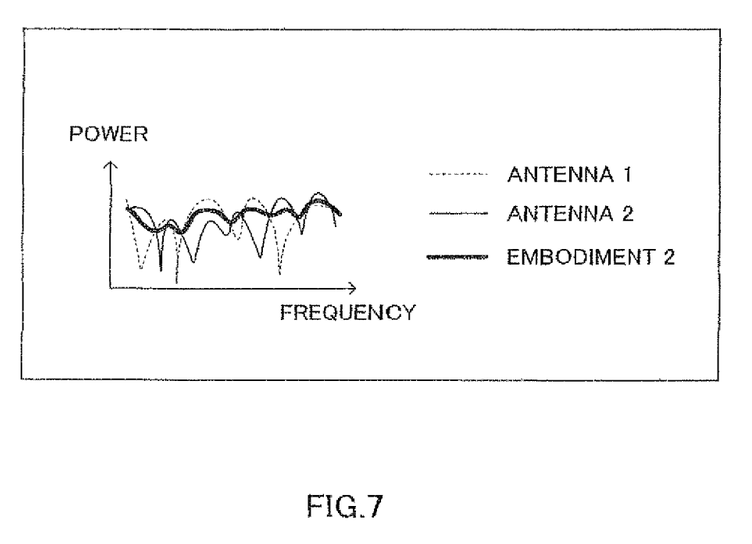
FIG. 7 is a frequency characteristic graph according to Embodiment 2 of the present invention.

FIG. 7 shows frequency characteristics at the time of signal reception by the communicating party when weighting factor setting according to this embodiment is performed. It can be seen from FIG. 7 that when weighting factor setting according to this embodiment is performed, frequency components whose received power falls significantly are eliminated. Comparing FIG. 7 with FIG. 4 (Embodiment 1), received power is smaller in FIG. 7 than in FIG. 4. However, if the estimation error of frequency characteristic of propagation path is large, larger received power is obtained by transmission of each frequency component from two antennas than by transmission from one antenna as in Embodiment 1.

Thus, according to this embodiment, received power can be reinforced for each frequency component, so that frequency components whose received power falls significantly are eliminated, and, as a result, error rate characteristics can be improved.

Embodiment 3

In Embodiment 1, a signal is deformed on an individual frequency component basis for each antenna by means of weighting factor multiplication, and there is consequently a possibility of a signal's PAPR (Peak to Average Power Ratio) becoming large compared with a case in which multiplication by a weighting factor is not performed. This possibility is greatly increased by creating non-transmitted frequency components in the frequency components within a signal. In the case of a large PAPR that comes within the nonlinear region of the transmitting amplifier characteristic, a transmit signal is distorted and the SNR deteriorates on the signal receiving side.

Thus, in this embodiment, the degree of signal deformation is reduced by transmitting only a frequency component where the difference in propagation path quality between antennas is greater than or equal to a threshold value from one antenna, and transmitting a frequency component where that difference is less than the threshold value from a plurality of antennas, thereby reducing the number of non-transmitted frequency components in signals transmitted from each antenna.

Figure 8:
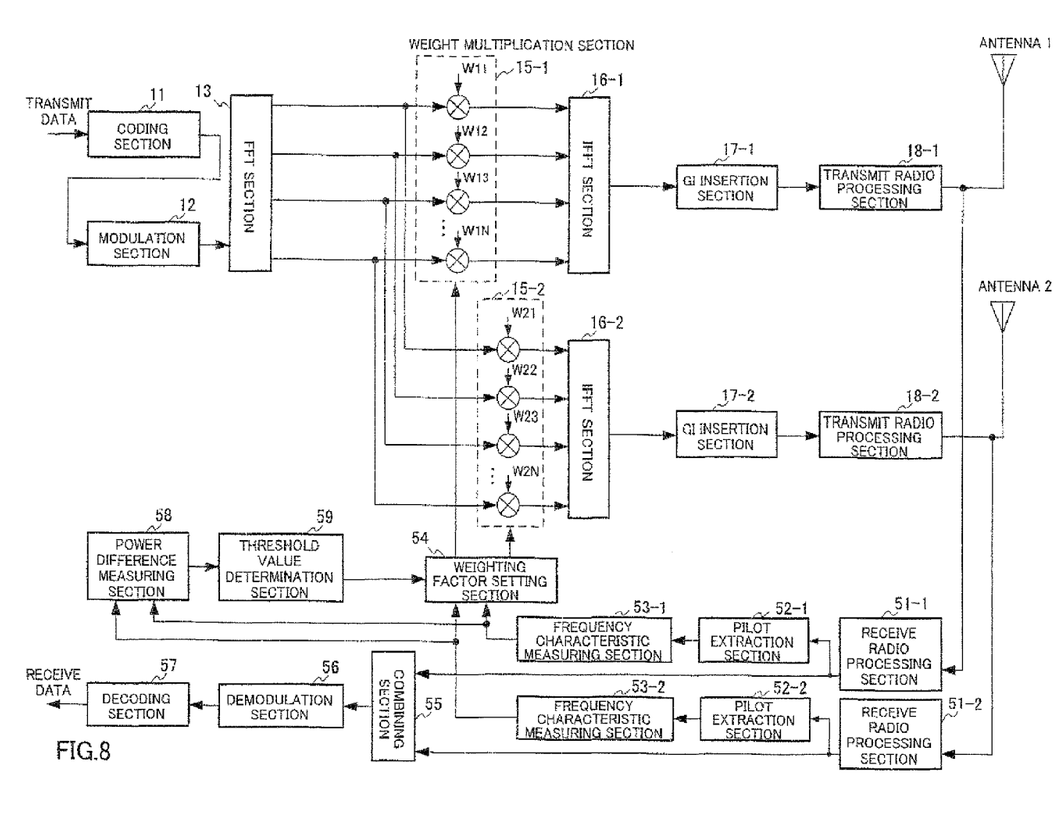
FIG. 8 is a block diagram showing the configuration of a radio communication apparatus according to Embodiment 3 of the present invention.

The configuration of a radio communication apparatus according to this embodiment is shown in FIG. 8. In the following description, configuration elements identical to those in Embodiment 1 (FIG. 1) are assigned the same reference numbers as in Embodiment 1, and descriptions thereof are omitted.

In the radio communication apparatus shown in FIG. 8, frequency characteristic measuring section 53-1 measures the received power values of frequency components 1 through N of a pilot symbol contained in a signal received by antenna 1, and inputs the received power values to weighting factor setting section 54 and a power difference measuring section 58. Also, frequency characteristic measuring section 53-2 measures the received power values of frequency components 1 through N of a pilot symbol contained in a signal received by antenna 2, and inputs the received power values to weighting factor setting section 54 and power difference measuring section 58.

Power difference measuring section 58 measures the difference between the received power value input from frequency characteristic measuring section 53-1 and the received power value input from frequency characteristic measuring section 53-2 for each frequency component. That is to say, power difference measuring section 58 measures the difference in the received power value of each frequency component between antenna 1 and antenna 2. This received power difference is input to a threshold value determination section 59.

Threshold value determination section 59 determines for each frequency component whether or not the received power difference input from power difference measuring section 58 is greater than or equal to a threshold value, and inputs the determination result to weighting factor setting section 54.

Weighting factor setting section 54 sets a weighting factor for the frequency component where the received power difference is determined to be greater than or equal to the threshold value using the setting method described in Embodiment 1. That is to say, weighting factor setting section 54, between antenna 1 and antenna 2, compares the received power values of a frequency component where the received power difference is determined to be greater than or equal to the threshold value, sets the weighting factor of the antenna where the received power value is larger to 1, and sets the weighting factor of the antenna where the received power value is smaller to 0. On the other hand, for a frequency component where the received power difference is determined to be less than the threshold value, weighting factor setting section 54 sets the weighting factor to 0.5 for both antennas. By performing this kind of weighting factor setting, only a frequency component where the received power difference is large—that is, only a frequency component where the difference in propagation path quality between the antennas is large—is transmitted from the antenna with the better propagation path quality, and other frequency components are transmitted from both antennas. Thus, the number of frequency components transmitted from only one antenna can be decreased, and the degree of signal deformation is reduced. By this means, an increase in the PAPR can be suppressed.

Thus, according to this embodiment, since deformation of frequency components at each antenna is kept to a minimum, an increase in the PAPR can be suppressed, and deterioration of error rate characteristics caused by signal deformation due to an increase in the PAPR can be suppressed. Also, frequency components having a large difference in propagation path quality can be transmitted from the antenna with the better propagation path quality with concentrated power, so that at the signal receiving side, frequency components whose received power falls significantly is eliminated, and it is possible to improve error rate characteristics.

Weighting factor setting section 54 of this embodiment may also use the setting method described in Embodiment 2 to set the weighting factor of a frequency component where the received power difference is determined to be greater than or equal to a threshold value.

Embodiment 4

In this embodiment, a radio communication apparatus is described that suppresses an increase in the PAPR by means of a different method from that in Embodiment 3.

Figure 9:
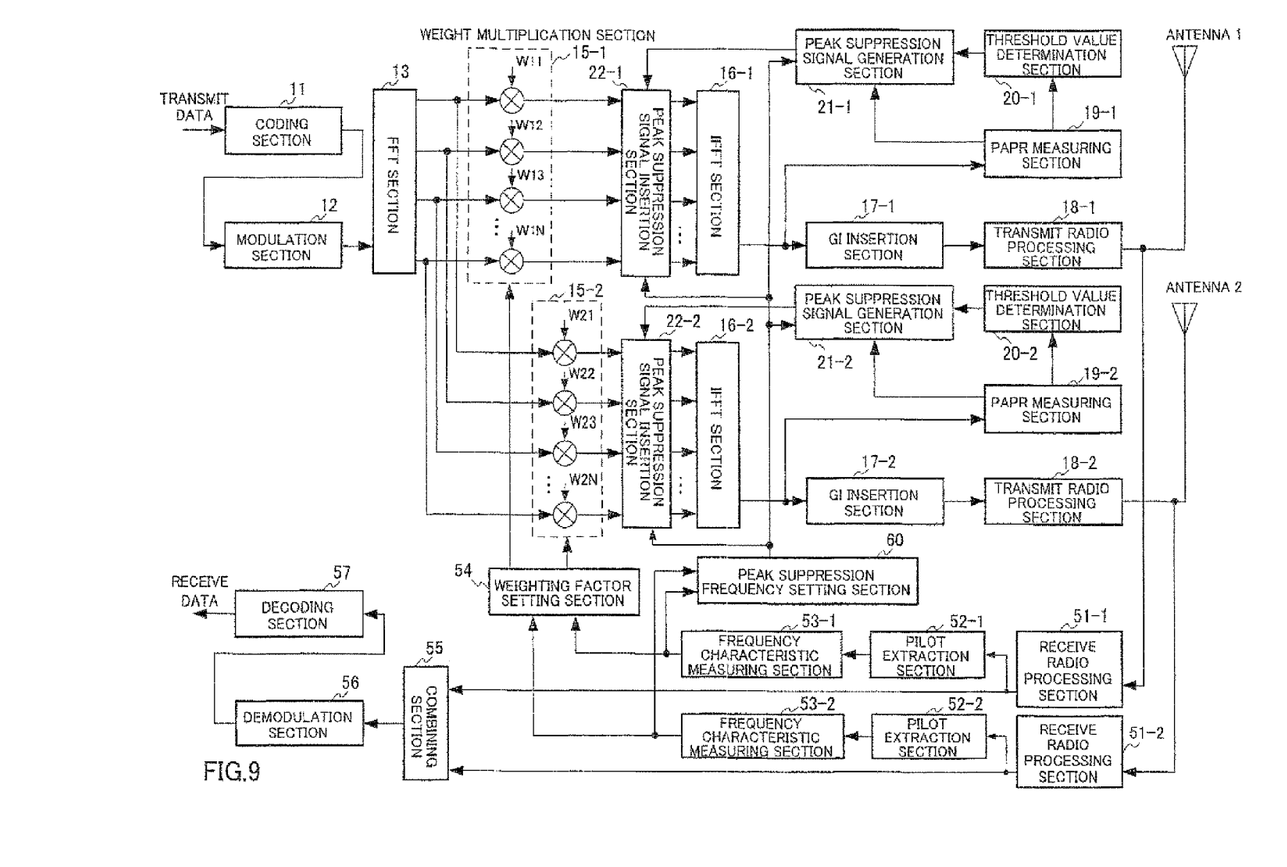
FIG. 9 is a block diagram showing the configuration of a radio communication apparatus according to Embodiment 4 of the present invention.

The configuration of a radio communication apparatus according to this embodiment is shown in FIG. 9. In the following description, configuration elements identical to those in Embodiment 1 (FIG. 1) are assigned the same reference numbers as in Embodiment 1, and descriptions thereof are omitted.

In the radio communication apparatus shown in FIG. 9, frequency characteristic measuring section 53-1 measures the received power values of frequency components 1 through N of a pilot symbol contained in a signal received by antenna 1, and inputs the received power values to weighting factor setting section 54 and a peak suppression frequency setting section 60. Also, frequency characteristic measuring section 53-2 measures the received power values of frequency components 1 through N of a pilot symbol contained in a signal received by antenna 2, and inputs the received power values to weighting factor setting section 54 and peak suppression frequency setting section 60.

Peak suppression frequency setting section 60 compares the received power values of a plurality of frequency components between the antennas, and of the plurality of frequency components, sets a frequency component where the received power value of one antenna is lower by a predetermined value or more than the received power value of the other antenna as a peak suppression frequency component. If the PAPR of a post-IFFT signal is greater than or equal to a threshold value, a signal for suppressing peak power (peak suppression signal) is inserted in this peak suppression frequency component. Then, peak suppression frequency setting section 60 inputs the setting result to peak suppression signal generation sections 21-1 and 21-2, and peak suppression signal insertion sections 22-1 and 22-2. When a peak suppression frequency component is set in this way, a frequency component in which a peak suppression signal is inserted becomes a frequency component multiplied by a weighting factor of 0 in Embodiment 1, and also becomes a frequency component that is transmitted from an antenna whose propagation path quality is considerably lower than that of the other antenna and suffers major propagation path attenuation, enabling an increase in the PAPR to be suppressed without causing deterioration of reception quality on the communicating party side due to the effects of the peak suppression signal.

On the other hand, PAPR measuring sections 19-1 and 19-2 provided for each antenna measure the PAPR value of a post-IFFT signal and input this value to threshold value determination sections 20-1 and 20-2, and peak suppression signal generation sections 21-1 and 21-2. Also, PAPR measuring sections 19-1 and 19-2 report the position on the time axis at which peak power occurred to peak suppression signal generation sections 21-1 and 21-2.

Threshold value determination sections 20-1 and 20-2 compare the input PAPR value with a threshold value, and if the PAPR value is greater than or equal to the threshold value, output a directive to generate a peak suppression signal to peak suppression signal generation sections 21-1 and 21-2.

in accordance with this directive, peak suppression signal generation sections 21-1 and 21-2 generate a peak suppression signal. Based on the position on the frequency axis of a frequency component set for peak suppression and the position of peak power on the time axis, peak suppression signal generation sections 21-1 and 21-2 generate a peak suppression signal with a phase such that that frequency component signal has the opposite phase at the peak power position on the time axis. Also, peak suppression signal generation sections 21-1 and 21-2 make the amplitude of the peak suppression signal a value proportional to the PAPR value. Another peak suppression signal generation method that can be used is the method described in Unexamined Japanese Patent Publication No. 2001-237800, for example. Peak suppression signal generation sections 21-1 and 21-2 then input the generated peak suppression signals to peak suppression signal insertion sections 22-1 and 22-2.

Peak suppression signal insertion sections 22-1 and 22-2 insert the peak suppression signal generated by peak suppression signal generation sections 21-1 and 21-2 respectively in a frequency component set by peak suppression frequency setting section 60.

Thus, according to this embodiment, an increase in the PAPR can be suppressed without causing deterioration of reception quality on the communicating party side due to peak suppression signal insertion, and deterioration of error rate characteristics due to signal distortion caused by an increase in the PAPR can be suppressed.

Embodiment 5

In this embodiment, a radio communication apparatus is described that suppresses an increase in the PAPR by means of a different method from those in Embodiments 3 and 4.

Figure 10:
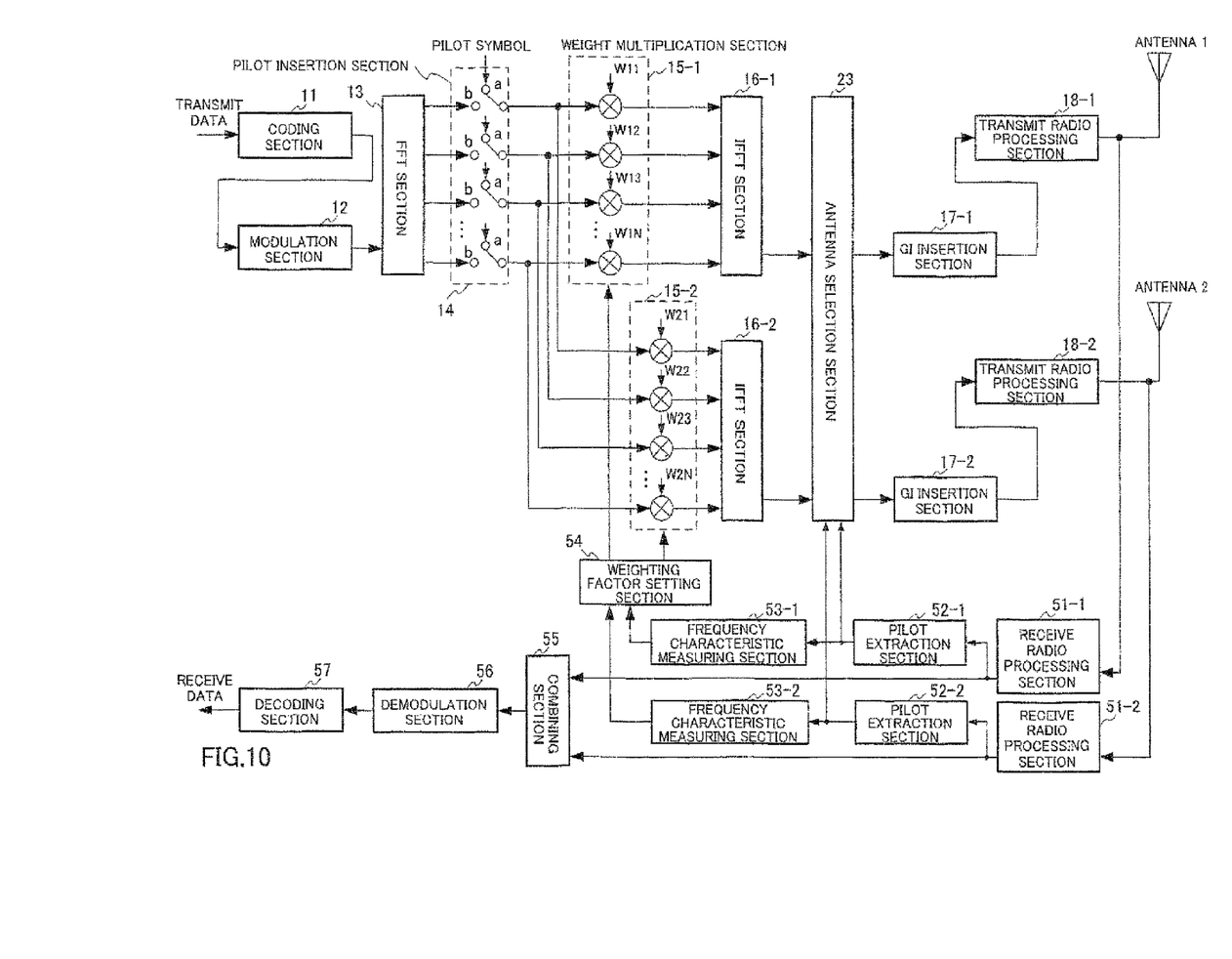
FIG. 10 is a block diagram showing the configuration of a radio communication apparatus according to Embodiment 5 of the present invention.

The configuration of a radio communication apparatus according to this embodiment is shown in FIG. 10. In the following description, configuration elements identical to those in Embodiment 1 (FIG. 1) are assigned the same reference numbers as in Embodiment 1, and descriptions thereof are omitted.

In the radio communication apparatus shown in FIG. 10, if the PAPR of a post-IFFT signal is greater than or equal to a threshold value, an antenna selection section 23 combines a signal that has undergone IFFT processing by IFFT section 16-1 and a signal that has undergone IFFT processing by IFFT section 16-2, and selects either antenna 1 or antenna 2 as the transmitting antenna for this combined signal. Antenna selection section 23 selects the antenna where the total power of all frequency components (that is, the total value of the propagation path qualities of all frequency components) is larger as the transmitting antenna.

Figure 11:
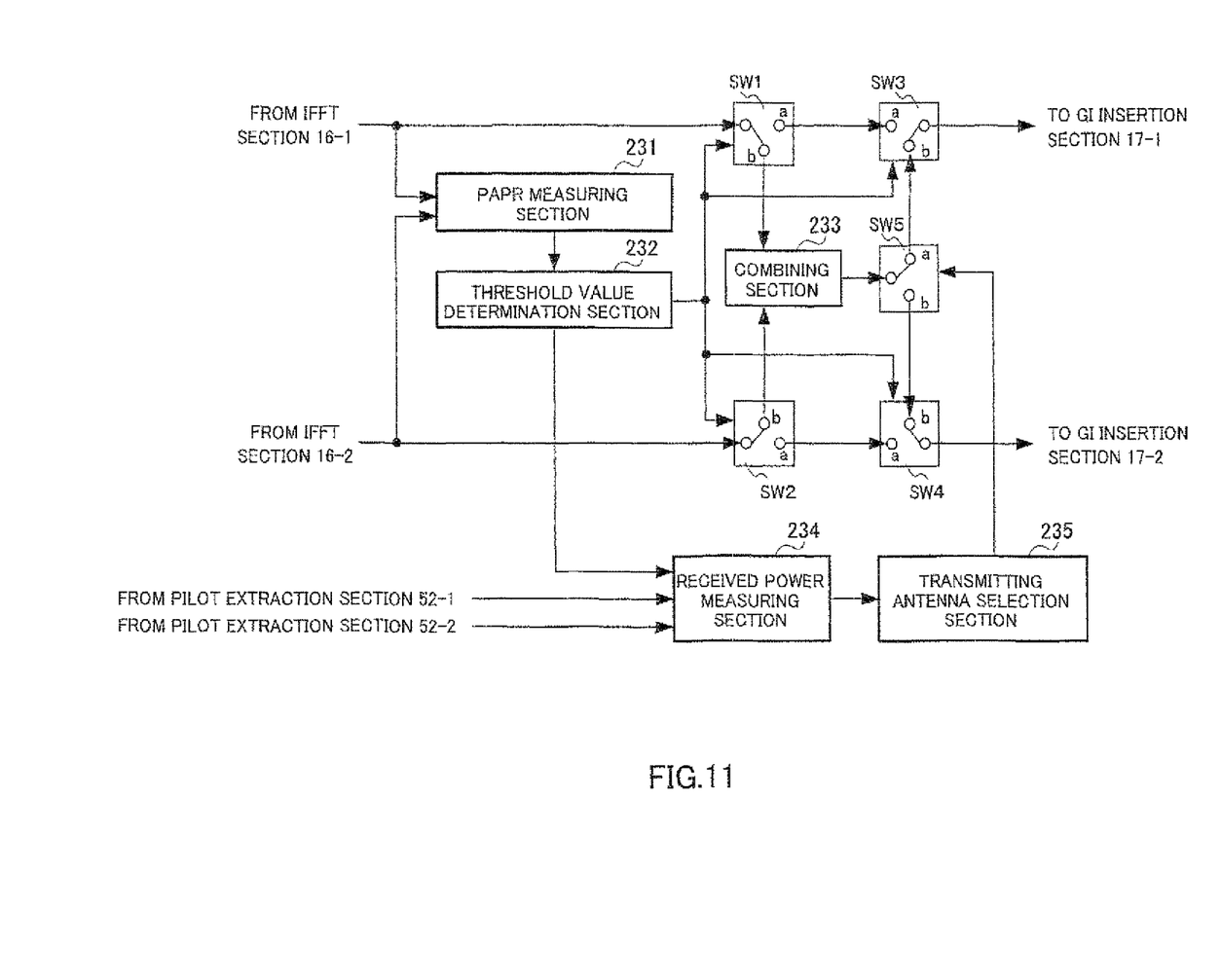
FIG. 11 is a block diagram showing the configuration of an antenna selection section according to Embodiment 5 of the present invention.

The internal configuration of antenna selection section 23 is shown in FIG. 11. In FIG. 11, a PAPR measuring section 231 measures the PAPR value of a post-IFFT signal input from IFFT section 16-1 (the PAPR value of antenna 1) and the PAPR value of a post-IFFT signal input from IFFT section 16-2 (the PAPR value of antenna 2), and inputs the PAPR values to a threshold value determination section 232.

Threshold value determination section 232 compares the antenna 1 PAPR value and the antenna 2 PAPR value with a threshold value, and if both PAPR values are less than the threshold value, connects SW1 through SW4 to the "a" side. Thus, when the antenna 1 PAPR value and antenna 2 PAPR value are both greater than or equal to the threshold value, in the same way as in Embodiment 1, a signal output from IFFT section 16-1 is input directly to GI insertion section 17-1, and a signal output from IFFT section 16-2 is input directly to GI insertion section 17-2.

On the other hand, if either the antenna 1 PAPR value or the antenna 2 PAPR value is greater than or equal to the threshold value, threshold value determination section 232 connects SW1 through SW4 to the "b" side, and also instructs a received power measuring section 234 to operate. Thus, in this case, a signal output from IFFT section 16-1 and a signal output from IFFT section 16-2 are both input to a combining section 233, and combining section 233 combines these two signals. The combined signal is output to SW5.

A pilot symbol extracted by pilot extraction section 52-1 and a pilot symbol extracted by pilot extraction section 52-2 are input to received power measuring section 234. In accordance with a directive from threshold value determination section 232, received power measuring section 234 measures the received power values of these pilot symbols (the received power value of antenna 1 and the received power value of antenna 2) in the time domain, and inputs the received power values to a transmitting antenna selection section 235. Thus, if the antenna 1 PAPR value and antenna 2 PAPR value are both less than the threshold value, received power measuring section 234 does not operate, and unnecessary power consumption is prevented. As the received power value measured in the time domain by received power measuring section 234 is the total power value for all frequency components, it is also possible for the total values of the received power of all frequency components measured by frequency characteristic measuring sections 53-1 and 53-2 to be used respectively as the antenna 1 received power value and the antenna 2 received power value.

Transmitting antenna selection section 235 compares the antenna 1 received power value and antenna 2 received power value, and selects the antenna with the larger received power value. If the antenna 1 received power value and antenna 2 received power value are equal, antenna 1 is selected. That is to say, transmitting antenna selection section 235 connects SW5 to the "a" side if the antenna 1 received power value is greater than or equal to the antenna 2 received power value, and connects SW5 to the "b" side if the antenna 2 received power value is greater than the antenna 1 received power value. By this means, when either the antenna 1 PAPR value or the antenna 2 PAPR value is greater than or equal to the threshold value, the signal combined by combining section 233 is transmitted from either antenna 1 or antenna 2.

Figure 12:
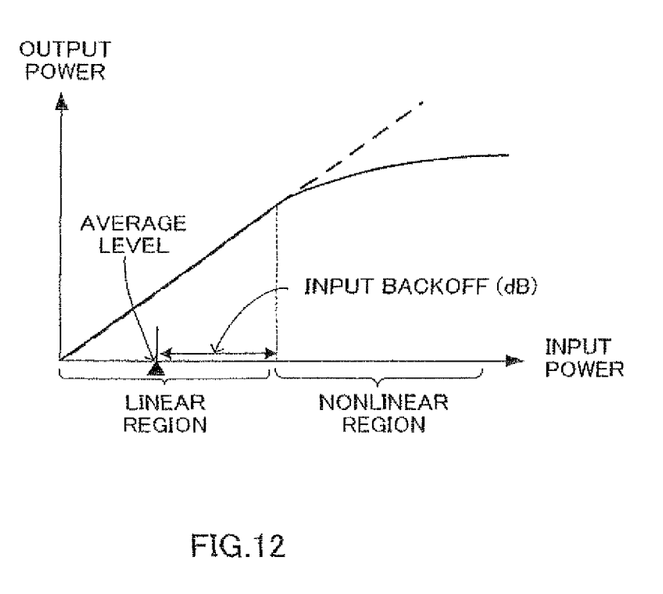
FIG. 12 is a power amplification characteristic graph according to Embodiment 5 of the present invention.

Next the method of setting the threshold value used by threshold value determination section 232 will be described. When the power amplification characteristic of the transmitting amplifiers of transmit radio processing sections 18-1 and 18-2 is as shown in FIG. 12, distortion occurs in a transmit signal if the PAPR comes within the nonlinear region of the amplifier characteristic. Therefore, to prevent transmit signal distortion, the PAPR threshold value used by threshold value determination section 232 is set to an input backoff power value—that is, a marginal power value from the average level in the linear region.

A signal following combining by combining section 233 is the same as the signal input from modulation section 12 to FFT section 13. Thus, in this embodiment, it is also possible to use a configuration whereby, if either the antenna 1 PAPR value or the antenna 2 PAPR value is greater than or equal to a threshold value, the signal input to FFT section 13 is transmitted directly instead of the combined signal.

Thus, according to this embodiment, the occurrence of nonlinear distortion in a transmit signal due to an increase in the PAPR can be prevented. Also, a signal is transmitted from the antenna with the best propagation path quality for each frequency component only when nonlinear distortion does not occur, enabling an improvement in reception quality to be achieved dependably on the signal receiving side.

In the above embodiments, a radio communication terminal apparatus may be indicated by "UE," and a radio communication base station apparatus by "Node B."

In the above embodiments, a signal transmitted from a radio communication apparatus may be, in addition to a signal transmitted by means of a single carrier, an IFDMA (Interleaved Frequency Division Multiple Access) signal having frequency components distributed at equal intervals, a Distributed FDMA signal, or a Localized FDMA signal using a localized band.

The function blocks used in the descriptions of the above embodiments are typically implemented as LSIs, which are integrated circuits. These may be implemented individually as single chips, or a single chip may incorporate some or all of them.

Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in or derivation from, semiconductor technology, integration of the function blocks may of course be performed using that technology. The adaptation of biotechnology or the like is also a possibility.

The present application is based on Japanese Patent Application No. 2004-224657 filed on Jul. 30, 2004, entire content of which is expressly incorporated herein by reference.

INDUSTRIAL APPLICABILITY

The present invention is suitable for use in a radio communication is base station apparatus or radio communication terminal apparatus used in a mobile communication system or the like.

The invention claimed is:

1. A receiving apparatus communicating with a radio communication apparatus, the receiving apparatus being configured to:
   transmit, to the radio communication apparatus, a pilot signal; and
   receive a first transmission signal and a second transmission signal, which are transmitted from the radio communication apparatus,
   wherein the first transmission signal is obtained by weighting, at the radio communication apparatus, each of a plurality of signals, which have respectively different frequencies in a frequency domain, using a first weighting factor, and the second transmission signal is obtained by weighting, at the radio communication apparatus, each of the plurality of signals using a second weighting factor, the first weighting factor and the second weighting factor being set for each of the plurality of signals, and each of the plurality of signals being multiplied by the first weighting factor and the second weighting factor in parallel.

2. The receiving apparatus according to claim 1, wherein the first weighting factor and the second weighting factor are set for each of the plurality of signals in accordance with a propagation path quality for the plurality of signals.

3. The receiving apparatus according to claim 1, wherein a first propagation path quality of one of antennas and a second propagation path quality of the other of the antennas are measured at the radio communication apparatus, and the first weighting factor and the second weighting factor are set for each of the plurality of signals in accordance with the first propagation path quality and the second propagation path quality for the plurality of signals.

4. The receiving apparatus according to claim 1, wherein one of the first weighting factor and the second weighting factor is set to 1 and the other is set to 0 for each of the plurality of signals.

5. A radio communication method comprising:
   transmitting a pilot signal to a radio communication apparatus; and
   receiving a first transmission signal and a second transmission signal, which are transmitted from the radio communication apparatus,
   wherein the first transmission signal is obtained by weighting, at the radio communication apparatus, each of a plurality of signals, which have respectively different frequencies in a frequency domain, using a first weighting factor, and the second transmission signal is obtained by weighting, at the radio communication apparatus, each of the plurality of signals using a second weighting factor, the first weighting factor and the second weighting factor being set for each of the plurality of signals, and each of the plurality of signals being multiplied by the first weighting factor and the second weighting factor in parallel.

* * * * *